No. 667,988. Patented Feb. 12, 1901.
C. G. MORRIS.
FRUIT PICKER.
(Application filed June 18, 1900.)
(No Model.)
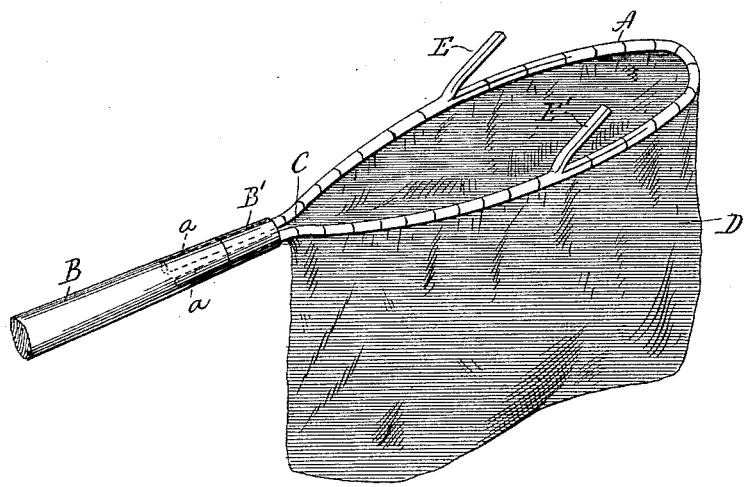
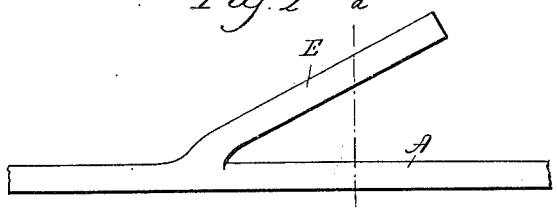
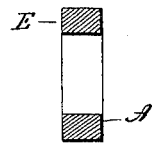
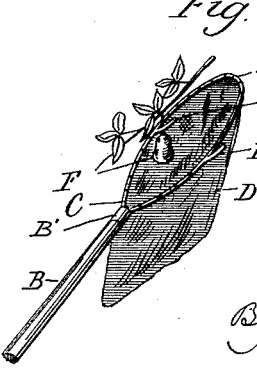
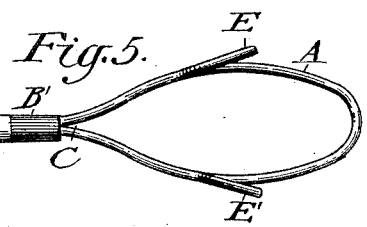
Charles G. Morris, Inventor.

UNITED STATES PATENT OFFICE.

CHARLES G. MORRIS, OF NEW HAVEN, CONNECTICUT.

FRUIT-PICKER.

SPECIFICATION forming part of Letters Patent No. 667,988, dated February 12, 1901.

Application filed June 18, 1900. Serial No. 20,649. (No model.)

*To all whom it may concern:*

Be it known that I, CHARLES G. MORRIS, of New Haven, in the county of New Haven and State of Connecticut, have invented a new Improvement in Fruit-Pickers; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a fruit-picker constructed in accordance with my invention; Fig. 2, a broken view of the frame thereof in side elevation; Fig. 3, a sectional view on the line $a\,b$ of Fig. 2; Fig. 4, a small perspective view showing the mode of using the device; Fig. 5, a plan view of the frame and picking-fingers of my improved fruit-picker with the fingers arranged as I prefer to arrange them.

My invention relates to an improvement in fruit-pickers, the object being to produce at a low cost for manufacture an extremely simple and convenient picker constructed to operate on the principle of breaking the stems of the fruit which is picked without contact with its flesh, whereby the fruit is prevented from being discolored or bruised.

With these ends in view my invention consists in a fruit-picker having such details of construction and combinations of parts, as will be hereinafter described, and pointed out in the claims.

In carrying out my invention as herein shown I form an elliptical frame A from a piece of wire or rod, the ends $a\,a$ of which are inserted into the upper end of a long handle B, furnished with a ferrule B', or the frame might be made of bent wood, or it might consist of a metal casting. The frame A is not a true ellipse, but rounded at its forward end and contracted at its rear end to form a throat C, which may or may not be used in picking fruit, or it may be rounded at both ends or contracted at both ends or contracted at its forward end and rounded at its rear end. A bag or receptacle D, of suitable material and size, is suspended from the frame, to which it is fastened by lashing in the ordinary manner. As herein shown, the frame is provided at opposite points with two picking-fingers E and E', which are at an acute angle to it and located in planes passing through the plane of the frame at about right angles to it, but preferably a few degrees greater than right angles, measured from the center axis of the plane of the frame, as shown in Fig. 5. These fingers, it will be observed, are arranged singly upon the frame and extend longitudinally, or substantially so, with respect to the adjacent portions thereof. As shown, these fingers extend forwardly, which I conceive to be their most convenient arrangement; but one or both of them might be turned rearwardly, if desired. As shown, the finger E, as well as the adjacent portion of the frame, is flattened in cross-section to increase the leverage upon the stem of the fruit, this flattening being in the plane of the frame. Preferably I employ two of these fingers; but I may employ only one, or I may increase the number above two. Those portions of the frame A which form the throat C are not flattened in cross-section and will not therefore grip the stems of the fruit as effectively as though flattened as the finger E and the portion of the frame A adjacent thereto are flattened; but though the portions of the frame forming the throat C are unflattened they will still perform the same picking function by engaging with the stems of the fruit at separated points.

The user of my improved picker turns its handle B on its longitudinal axis, so as to bring the frame A into a vertical or substantially vertical plane, as shown in Fig. 4, whereby the fingers E E' of the picker are brought into a substantially horizontal plane. The picker is then moved gently forward, whereby the crotch or throat formed by one of the fingers and the adjacent portion of the frame is caused to embrace the stem of the fruit, such as a pear F. The handle B is then again turned on its longitudinal axis, so as to cause the lower edge of the frame to move first under and then up to the level of the fruit and bring the bag or receptacle beneath it. The stem will by this movement be broken or parted and the fruit will drop into the bag D without its flesh being touched in any part by the frame or fingers of the device. One finger or the other is used, according to the position of the fruit. If the throat C is used, the picker will be operated in substantially the same manner and the stem broken or parted.

I particularly wish to call attention to the fact that there is no engagement of the flesh of the fruit with the frame or fingers and that neither the fruit nor the branch is pushed or pulled in the operation of picking. With a little experience in the use of my device fruit may be picked without touching its flesh at all by simply breaking or parting its stem, very much in the manner of carefully picking fruit by hand.

The advantages of picking choice varieties of peaches and pears without touching their delicate flesh are too obvious for argument, and any method of gathering which does not shake the branch will save much ripe fruit from being jarred to the ground.

In view of the modifications suggested and of others which may obviously be made I would have it understood that I do not limit myself to the exact construction herein shown and described, but hold myself at liberty to make such alterations as fairly fall within the spirit and scope of my invention.

Having fully described my invention, what I claim as new, and desire to secure by Letters Patent, is—

1. A fruit-picker consisting of a frame, a handle in which the same is mounted, a receptacle or bag depending from the frame, and one or more fruit-picking fingers arranged singly upon one or both sides of the frame, located at an acute angle to the frame in planes at right angles to the plane thereof and substantially tangent to the said plane of the frame.

2. A fruit-picker having a handle, an elliptical frame, a bag or receptacle depending from the same, and two fruit-picking fingers respectively located upon the sides of the frame, placed at an acute angle thereto in planes at or about right angles to the plane thereof and substantially tangent to the said plane of the frame, and coacting with the adjacent portions of the frame for picking the fruit.

In testimony whereof I have signed this specification in the presence of two subscribing witnesses.

CHARLES G. MORRIS.

Witnesses:
F. C. EARLE,
GEORGE DUDLEY SEYMOUR.